United States Patent
Hasegawa

(10) Patent No.: US 7,324,891 B2
(45) Date of Patent: Jan. 29, 2008

(54) ENGINE CONTROL METHOD AND DEVICE

(75) Inventor: Shumpei Hasegawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 11/365,867

(22) Filed: Mar. 2, 2006

(65) Prior Publication Data

US 2006/0200301 A1 Sep. 7, 2006

(30) Foreign Application Priority Data

Mar. 3, 2005 (JP) ............................. 2005-058774

(51) Int. Cl.
*F02D 45/00* (2006.01)
*G06F 19/00* (2006.01)

(52) U.S. Cl. ..................................... 701/114

(58) Field of Classification Search ................ 701/114, 701/110, 115, 102; 123/480, 399; 73/117.3
See application file for complete search history.

(56) References Cited

U.S. PATENT DOCUMENTS 6,820,470 B2 * 11/2004 Shidara et al. ............. 73/117.3
7,203,594 B2 * 4/2007 Hasegawa ................... 701/114

FOREIGN PATENT DOCUMENTS

| JP | 10-176582 A | 6/1998 |
| JP | 2003-307152 A | 10/2003 |
| JP | 2005-307782 A * | 11/2005 |

* cited by examiner

Primary Examiner—Hieu T. Vo
(74) Attorney, Agent, or Firm—Birch, Stewart, Kolasch & Birch, LLP

(57) ABSTRACT

An engine control method and compensation suitable for the case that both of two manifold pressure sensors in individual groups have failed. When detection outputs from two manifold pressure sensors are different from each other, a first comparing section determines that one of the two sensors is abnormal. A manifold pressure estimating section calculates an estimated manifold pressure value according to an engine speed, throttle opening, and atmospheric pressure. A calculating section calculates a difference $\Delta PMb$ between the detection output PMb and the estimated value PMcal. A calculating section calculates a difference $\Delta PMa$ between the detection output PMa and the estimated value PMcal. A second comparing section identifies an abnormal one of these two manifold pressure sensors corresponding to a larger one of these differences $\Delta PMa$ and $\Delta PMb$. When the remaining manifold pressure sensor has also failed, the estimated value PMcal is used as a substitutional value, then continuing the engine control.

20 Claims, 8 Drawing Sheets

101: A sensors
102: A power supply
201: B sensors
202: B power supply

S114: Calculate PMx from VPM ~ PM table

S115: Calculate PMcal according to Ne, PLP, and PAa

ENGINE CONTROL METHOD AND DEVICE

CROSS-REFERENCE TO RELATED APPLICATION

The present application claims priority under 35 U.S.C. §119 to Japanese Patent Application No. 2005-058774, filed Mar. 3, 2005, the entire contents of which are hereby incorporated by reference.

BACKGROUND OF THE INVENTION

1. Field of the Invention

The present invention relates to an engine control method and device, and more particularly to an engine control method and device in a system having a first manifold pressure sensor and a second manifold pressure sensor serving as a backup for the first manifold pressure sensor, in which the operation of the system can be continued even when both of these two sensors have failed.

2. Description of Background Art

In a conventional engine control system, many sensors are used and a failure diagnosing system for diagnosing whether or not these sensors are normal is known. For example, Japanese Patent Laid-open No. 2003-307152 discloses a method including the steps of determining whether or not an output signal from a sensor for detecting a pressure in an intake manifold falls within a preset range, calculating a pressure in the intake manifold according to engine operating conditions, and determining whether or not the difference between the detected intake manifold pressure indicated by the output signal from the sensor and the calculated intake manifold pressure is less than a preset value in the case that the output signal from the sensor falls within the above preset range, wherein when the output signal from the sensor does not fall within the above preset range or when the above difference is not less than the above preset value, the calculated intake manifold pressure is set as an intake manifold pressure.

Further, Japanese Patent Laid-open No. Hei 10-176582 discloses an electronically controlled throttle device having two sensor systems each having an accelerator sensor, throttle sensor, etc. for the purposes of fail-safe sensing or the like, in which failure diagnosis is performed by comparing sensor outputs from these two sensor systems. For example, it is determined whether or not the throttle sensor is abnormal by comparing a deviation in sensor output between a main throttle sensor and a sub-throttle sensor with a threshold value.

As to a failure such as breaking of a wire and short circuit, of sensor system failures, the abnormality of any sensor can be determined when an output value from the sensor is greater than or less than a predetermined value or a predetermined range, and a predetermined operation against this abnormality can be performed. However, although the sensor output value falls within the predetermined range, there is a case that the abnormality due to a change or deterioration in output characteristics of the sensor cannot be determined. For example, in controlling an engine for an aircraft, a stricter standard for the accuracy of failure diagnosis is provided, so that there is a case that the conventional failure diagnosing method is insufficient.

In the failure diagnosing method described in Japanese Patent Laid-open No. Hei 10-176582, the failure of one of the two sensor systems can be detected. However, no measures against the failure of both of the two sensor systems are taken.

SUMMARY AND OBJECTS OF THE INVENTION

It is accordingly an object of the present invention to provide an engine control method and device having two manifold pressure sensors in individual groups which can continue the control even when both of the two manifold pressure sensors have failed.

In accordance with the present invention, a control method is provided for an engine having a first manifold pressure sensor and a second manifold pressure sensor serving as a backup for said first manifold pressure sensor in the case that said first manifold pressure sensor has failed. The control method includes the steps of calculating an estimated manifold pressure value according to an engine speed, a throttle opening, and an atmospheric pressure in the case that both of said first and second manifold pressure sensors have failed; and substituting said estimated manifold pressure value for a detected manifold pressure value.

In a system adopting a redundant control method as having first and second manifold pressure sensors, the engine control can be continued by using the estimated manifold pressure value even when both of the two manifold pressure sensors have failed. Accordingly, in an engine to be controlled by the control method of the present invention, the reliability with a high triple-redundancy level can be ensured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the present invention, and wherein.

DETAILED DESCRIPTION OF THE PREFERRED EMBODIMENTS

Figure 2:
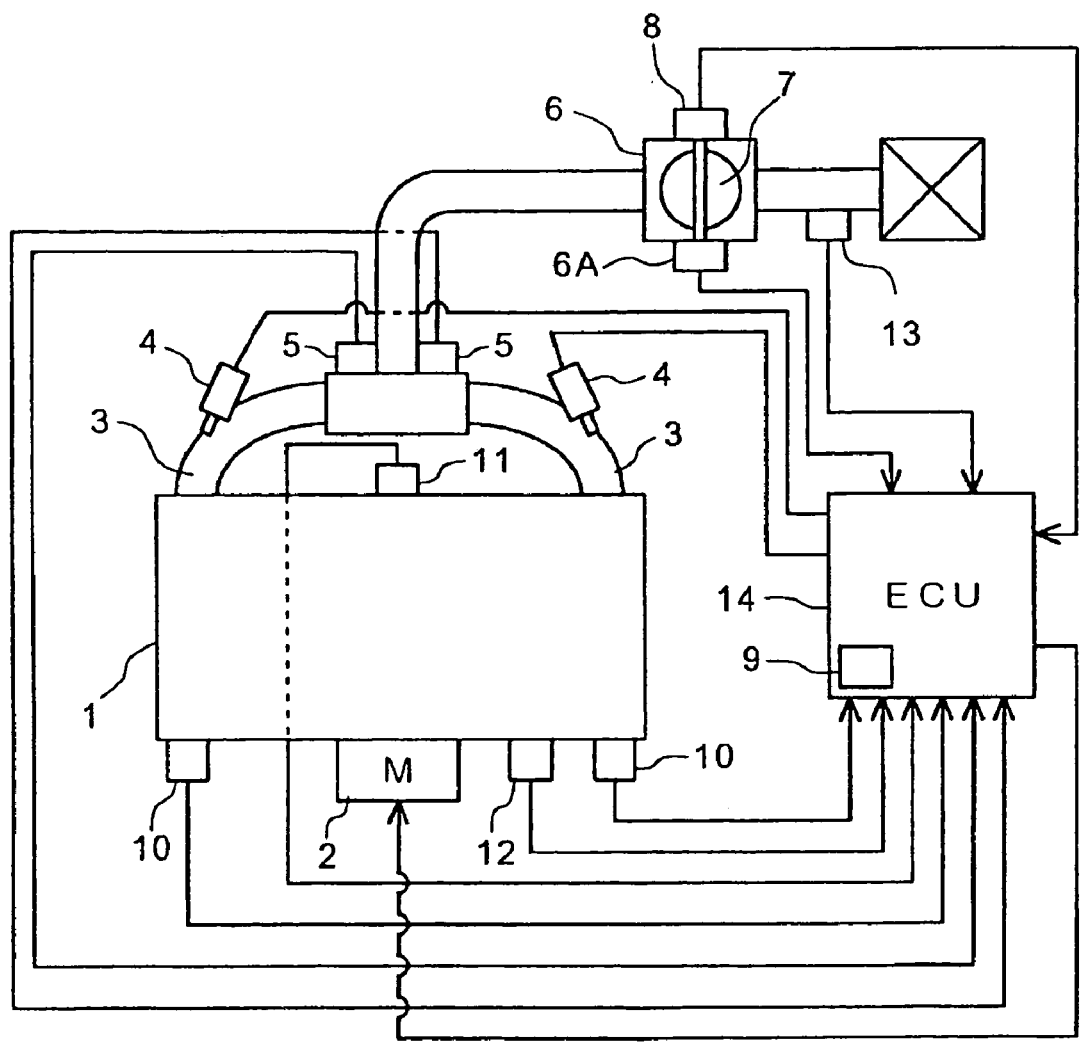
FIG. 2 is a schematic diagram of an engine control system including a failure diagnosing device according to the preferred embodiment.

One embodiment of the present invention will now be described with reference to the drawings. FIG. 2 is a schematic diagram of an engine control system including a failure diagnosing device according to a preferred embodiment of the present invention. In FIG. 2, reference numeral 1 denotes a reciprocating internal-combustion engine for an aircraft. A starter motor 2 is provided to start the engine 1. While the engine 1 is a two-cylinder engine as shown in FIG. 2, the number of cylinders is not limited. The engine 1 is provided with two intake manifold pipes 3, and each intake manifold pipe 3 is provided with a fuel injector 4 and a manifold pressure sensor 5 for detecting a pressure in the corresponding intake manifold pipe 3. The manifold pressure sensor 5 in each intake manifold pipe 3 is located upstream of the corresponding fuel injector 4. Each manifold pressure sensor 5 is composed of a main sensor and a backup sensor. In the case of distinguishing between the main sensor and the backup sensor, the main sensor is referred to as a first manifold pressure sensor 5A, and the backup sensor is referred to as a second manifold pressure sensor 5B.

A throttle body 6 is located upstream of the manifold pressure sensors 5. A throttle valve 7 is incorporated in the throttle body 6. The throttle valve 7 is driven by a motor 8. Various known sensors including an atmospheric pressure sensor 9, cam pulser 10, crank pulser 11, coolant temperature sensor 12, and air temperature sensor 13 are provided for control of the engine 1.

An electronic control unit (ECU) 14 is provided to input detection signals output from the above-mentioned sensors and to perform fuel injection control and ignition control according to a program. The ECU 14 includes a failure diagnosing function for each manifold pressure sensor 5 and a compensating function of computing a substitute value for a manifold pressure in the case that each manifold pressure sensor 5 has failed.

Figure 3:
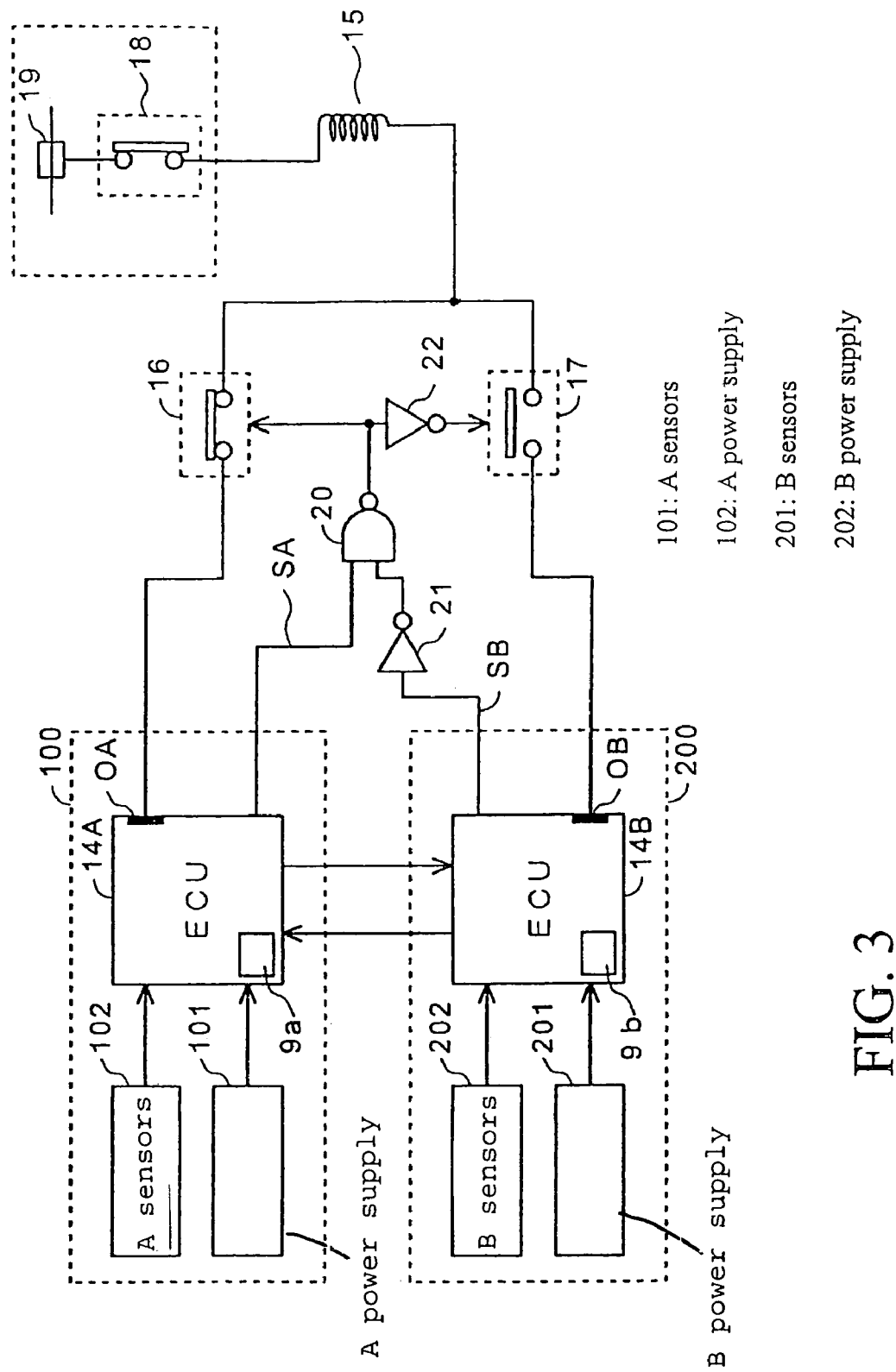
FIG. 3 is a block diagram showing an essential part of the engine control system including a failure diagnosing device shown in FIG. 2.

FIG. 3 is a block diagram showing an essential part of the engine control system shown in FIG. 2. As shown in FIG. 3, the engine control system according to this preferred embodiment includes two systems for a detection circuit by the sensors and the ECU 14 from a fail-safe point of view. The two systems will be hereinafter referred to as an A lane 100 and a B lane 200. The A lane 100 includes A sensors 101 including the sensors shown in FIG. 2, an A power supply 102, and an ECU 14A. Similarly, the B lane 200 includes B sensors 201, a B power supply 202, and an ECU 14B. The manifold pressure sensor 5 included in the A sensors 101 is a main sensor, and the manifold pressure sensor 5 included in the B sensors 201 is a backup sensor to be used in the case that the main sensor has failed.

Atmospheric pressure sensors 9a and 9nb are provided on circuit boards or housings (both not shown) of the ECU 14A and the ECU 14B, respectively. However, the positions of the atmospheric pressure sensors 9a and 9b are not limited.

The ECUs 14A and 14B are allowed to bidirectionally communicate with each other through their own communication interfaces (not shown). Each fuel injector 4 has a drive coil 15. One end (minus side) of the drive coil 15 is connected through selector switches 16 and 17 respectively to injection signal output terminals OA and OB of the ECUs 14A and 14B. The other end (plus side) of the drive coil 15 is connected through a power switch 18 to a power supply 19 designed to output a voltage of 14 V, for example. The power switch 18 has a current limiting function. The power supply 19 and the power switch 18 are provided in each of the ECUs 14A and 14B.

A selector signal SA output from the ECU 14A is connected to one of the two inputs of a NAND circuit 20, and a selector signal SB output from the ECU 14B is connected through a NOT circuit 21 to the other input of the NAND circuit 20. The output of the NAND circuit 20 is input to the selector switch 16 and also input through another NOT circuit 22 to the selector switch 17.

A current is passed from the power supply 19 through the drive coil 15 according to the state of the injection signal output terminal of the lane connected to either the selector switch 16 or 17 selected by the selector signal SA or SB. The valve opening time or fuel injection amount of each fuel injector 4 is determined by the time of passage of the current through the drive coil 15.

Next, a compensating function will be described in the case that the manifold pressure sensors 5 included in the A sensors 101 and the B sensors 201 has failed. In this preferred embodiment, the A lane 100 is used for main control, and the B lane 200 serves as a backup for the A lane 100. In the case that the A lane 100 has not failed, the control by the A lane 100 is continued. In the case that the A lane 100 has failed, the B lane 200 is substituted for the A lane 100, and the subsequent control is performed by the B lane 200. In the case that the B lane 200 has also failed, a substitute value is used. In the following description, a substitute value is used in the case that the manifold pressure sensors 5 included in both of the A lane 100 and the B lane 200 have failed. In particular, an estimated manifold pressure value computed by using an engine speed, a throttle opening, and an atmospheric pressure is substituted for an output value from each manifold pressure sensor 5. A manifold pressure is uniquely determined by an engine speed and a throttle opening at a certain atmospheric pressure.

Figure 4:
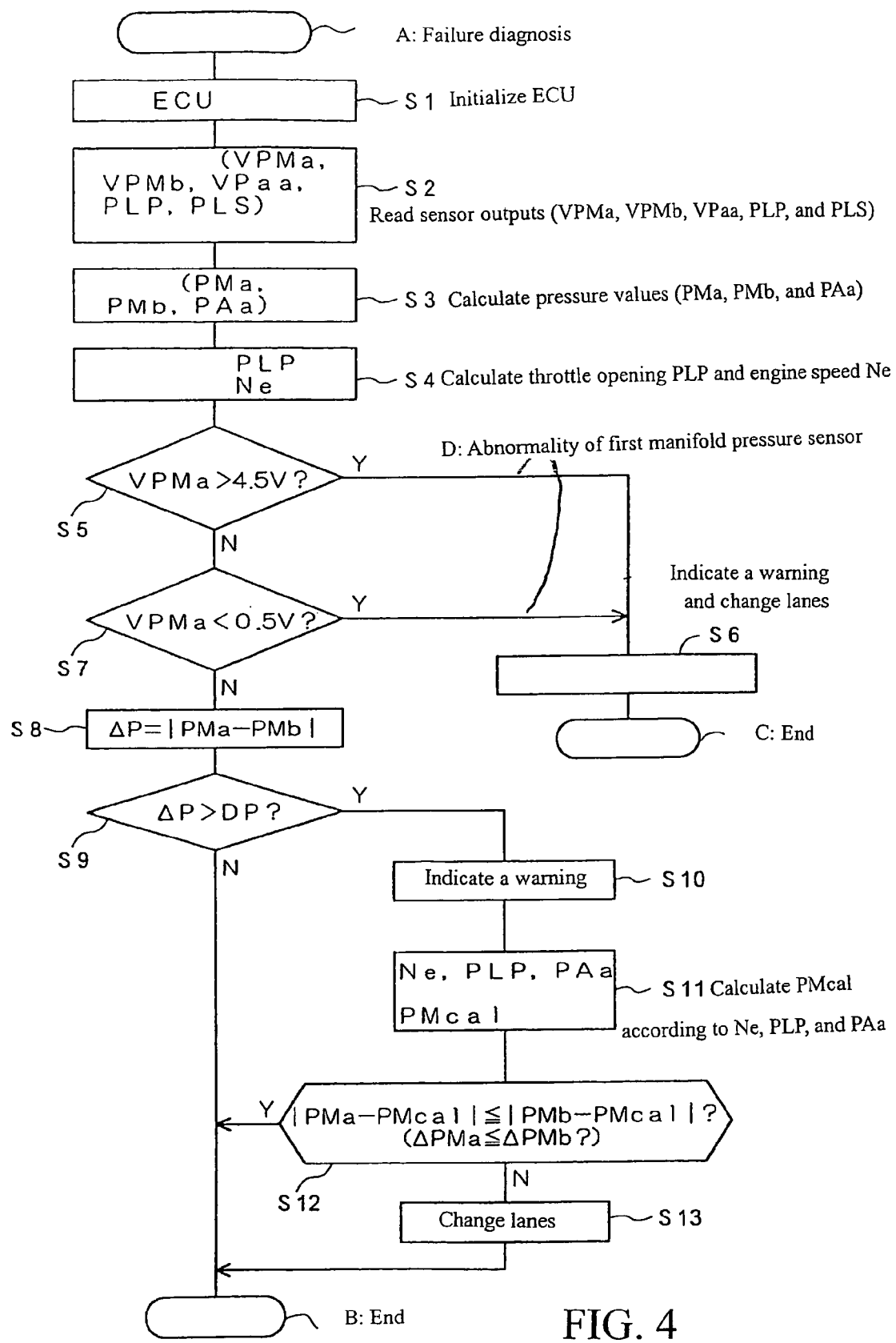
FIG. 4 is a flowchart showing the processing by the failure diagnosing device according to the preferred embodiment.

FIG. 4 is a flowchart showing the failure diagnosing processing for the manifold pressure sensors 5 and the compensating processing in the case of failure. The processing shown in FIG. 4 is started when a starting switch for the engine 1 is turned on. In step S1, the ECUs 14A and 14B are initialized. In step S2, read are an output voltage VPMa from the manifold pressure sensor (first manifold pressure sensor) 5A in the A lane 100, an output voltage VPMb from the manifold pressure sensor (second manifold pressure sensor) 5B in the B lane 200, an output voltage VPaa from the atmospheric pressure sensor 9a in the A lane 100, crank pulses PLS output from the crank pulser 11 in the A lane 100, and a throttle opening PLP. The throttle opening PLP may be detected according to a rotational amount of the motor 8 (the number of steps in the case that the motor 8 is a step motor), for example.

In step S3, physical pressure values PMa, PMb, and PAa (mmHg in unit) are calculated according to the output voltages VPMa, VPMb, and VPaa, respectively. For example, the output voltages are converted into the respectively physical pressure values by using a conversion table prepared in advance. In step S4, an engine speed Ne (rpm) is calculated according to the crank pulses PLS. For example, the engine speed Ne may be calculated according to the spacing of the crank pulses PLS. No detection of the crank pulses PLS shows that the engine 1 is at rest.

In step S5, it is determined whether or not the voltage VPMa is greater than a predetermined upper limit (e.g., 4.5 V). If the answer in step S5 is affirmative, it is determined that the first manifold pressure sensor 5A is abnormal due to short circuit or the like, and the program proceeds to step S6, in which a warning is indicated and the A lane 100 is changed to the B lane 200 as a step of processing in the case of abnormality. If the answer in step S5 is negative, the program proceeds to step S7.

In step S7, it is determined whether or not the voltage VPMa is less than a predetermined lower limit (e.g., 0.5 V). If the answer in step S7 is affirmative, it is determined that the first manifold pressure sensor 5A is abnormal due to breaking of a wire or the like, and the program proceeds to step S6 to perform the above-mentioned processing in the case of abnormality.

If the answer in step S7 is negative, it is determined that the first manifold pressure sensor 5A has no failure due to short circuit and breaking of a wire. However, even in the case that the first manifold pressure sensor 5A is abnormal in function due to deterioration or the like and does not output a normal pressure value, there is a possibility that the output voltage VPMa falls within a given range defined by the upper limit and the lower limit. Accordingly, the abnormality in function due to deterioration cannot be determined by the steps S5 and S7.

To cope with this problem, the following processing is performed to determine whether or not the first manifold pressure sensor 5A has deteriorated. In step S8, the difference $\Delta P$ between the manifold pressures PMa and PMb is calculated. This difference $\Delta P$ is obtained as an absolute value. In step S9, it is determined whether or not the difference $\Delta P$ is greater than a threshold value DP. The threshold value DP is set to 44.8 mmHg, for example. It is not conceivable that both of the first and second manifold pressure sensors 5A and 5B deteriorate at the same time by the same amount. Therefore, if the difference $\Delta P$ is less than the threshold value DP, it is determined that the both of the first and second manifold pressure sensors 5A and 5B normally operate, and the usual control loop is therefore continued.

If the difference $\Delta P$ is greater than the threshold value DP, it is determined that either the first or second manifold pressure sensor 5A or 5B is abnormal in function. Then, the program proceeds to step S10 to indicate a warning for showing the abnormality.

In the following steps, it is identified which of the manifold pressure sensors 5A and 5B is abnormal. In step S11, an estimated manifold pressure value PMcal is calculated according to the engine speed Ne (rpm), the throttle opening PLP (%), and the atmospheric pressure PAa (mmHg).

In step S12, the absolute value ($\Delta$PMa) of the difference between the manifold pressure value PMa detected by the first manifold pressure sensor 5A and the estimated manifold pressure value PMcal is compared with the absolute value ($\Delta$PMb) of the difference between the manifold pressure value PMb detected by the second manifold pressure sensor 5B and the estimated manifold pressure value PMcal.

If $\Delta$PMa is greater than $\Delta$PMb, the answer in step S12 is negative. In this case, it is determined that the first manifold pressure sensor 5A is abnormal due to deterioration or the like. Then, the program proceeds to step S13 to change the A lane 100 to the B lane 200. Thereafter, the output from the B lane 200 is adopted to perform the engine control.

Conversely, if $\Delta$PMb is greater than $\Delta$PMa, the answer in step S12 is affirmative. In this case, it is determined that the second manifold pressure sensor 5B is abnormal due to deterioration or the like. In other words, the A lane 100 as the main or usual control lane is not abnormal, and the engine control by the A lane 100 is therefore continued.

Figure 5:
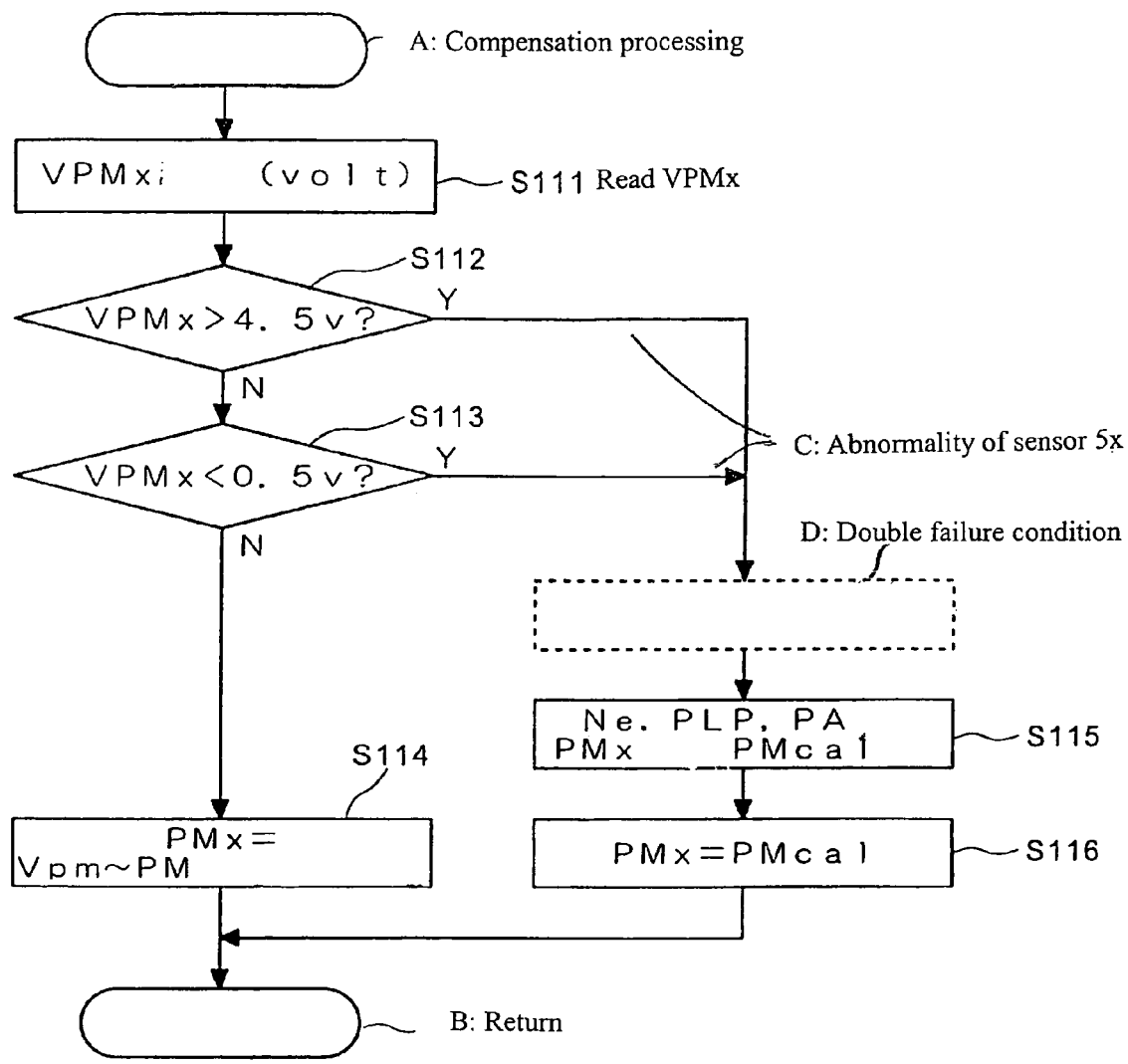
FIG. 5 is a flowchart showing the processing by the sensor output compensating device according to the preferred embodiment.

There will now be described a procedure to be performed after determining that either the first or second manifold pressure sensor 5A or 5B has failed. FIG. 5 is a flowchart showing such a procedure that either the A lane 100 or the B lane 200 has failed and the remaining lane 200 or 100 is thereafter used to perform the engine control. In the following description, the remaining lane will be hereinafter referred to as "lane X", and a symbol "x" will be hereinafter attached to the reference numerals and symbols denoting the sensors and their output values in the lane X.

In step S111, an output voltage VPMx from the manifold pressure sensor 5x is read. In step S112, it is determined whether or not the output voltage VPMx is greater than a predetermined upper limit (e.g., 4.5 V). If the answer in step S112 is negative, the program proceeds to step S113.

In step S113, it is determined whether or not the output voltage VPMx is less than a predetermined lower limit (e.g., 0.5 V). If the answer in step S113 is negative, the program proceeds to step S114 to calculate a manifold pressure PMx with reference to a conversion table according to the output voltage VPMx from the manifold pressure sensor 5x.

If the answer in step S112 is affirmative, it is determined that the manifold pressure sensor 5x is abnormal due to short circuit or the like. Accordingly, it is determined that a double failure condition of the sensors has occurred, and the program proceeds to step S115 to calculate an estimated manifold pressure value PMcal as a substitute value for the output from the manifold pressure sensor 5x according to the engine speed Ne (rpm), the throttle opening PLP (%), and the atmospheric pressure PAa (mmHg).

Similarly, if the answer in step S113 is affirmative, it is determined that the manifold pressure sensor 5x is abnormal due to breaking of a wire, and the program proceeds to step S115 to calculate the estimated manifold pressure value PMcal.

The estimated manifold pressure value PMcal calculated in step S115 is used as a substitute value for the manifold pressure value PMx detected by the manifold pressure sensor 5x (step S 16).

Figure 6:
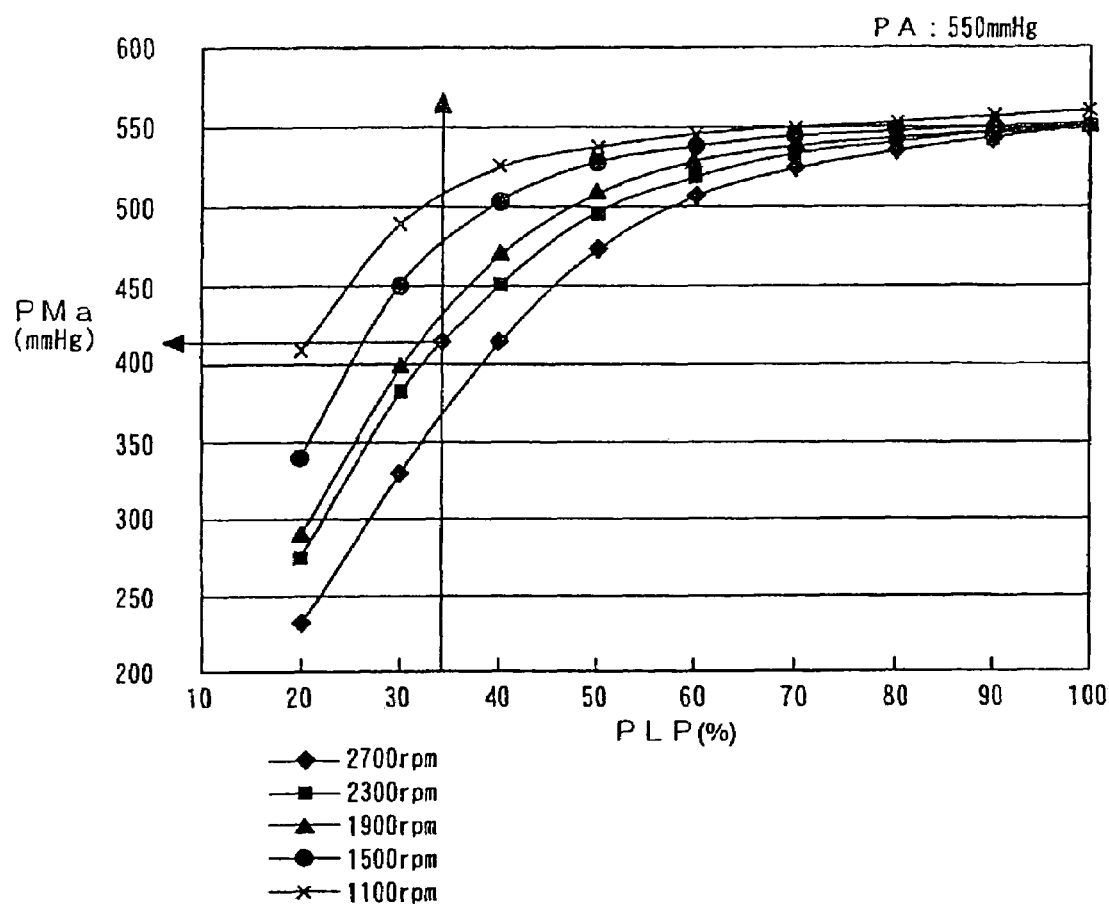
FIG. 6 is a data table to be used for the calculation of an estimated manifold pressure value.

FIG. 6 is a data table showing the relation among the engine speed Ne, the atmospheric pressure PA, the manifold pressure PMa, and the throttle opening PLP. This data table is obtained by operating the engine 1 at various speeds Ne in a test machine capable of setting various atmospheric pressures PA and by setting the atmospheric pressure PA to 550 mmHg. In FIG. 6, the vertical axis represents the manifold pressure PMa and the horizontal axis represents the throttle opening PLP. The above-set atmospheric pressure PA of 550 mmHg is regarded as a representative atmospheric pressure in the case that an aircraft having the engine 1 is flying at an altitude of 8000 feet.

In the case that the engine speed Ne is 2300 rpm and the throttle opening PLP is 35%, the manifold pressure PMa can be obtained by using this data table in the following manner. In FIG. 6, an intersection X between a vertical line corresponding to the throttle opening PLP of 35% and a curve corresponding to the engine speed Ne of 2300 rpm is obtained, and a value for the manifold pressure PMa corresponding to this intersection X can be read. Thus, the estimated manifold pressure value PMcal can be obtained. In the above case, the estimated manifold pressure value PMcal becomes 420 mmHg as apparent from FIG. 6.

The data shown in FIG. 6 is stored in memory means provided in the ECUs 14A and 14B, and the estimated manifold pressure value PMcal is calculated by applying a functional operation or linear interpolation to this data.

Figure 7:
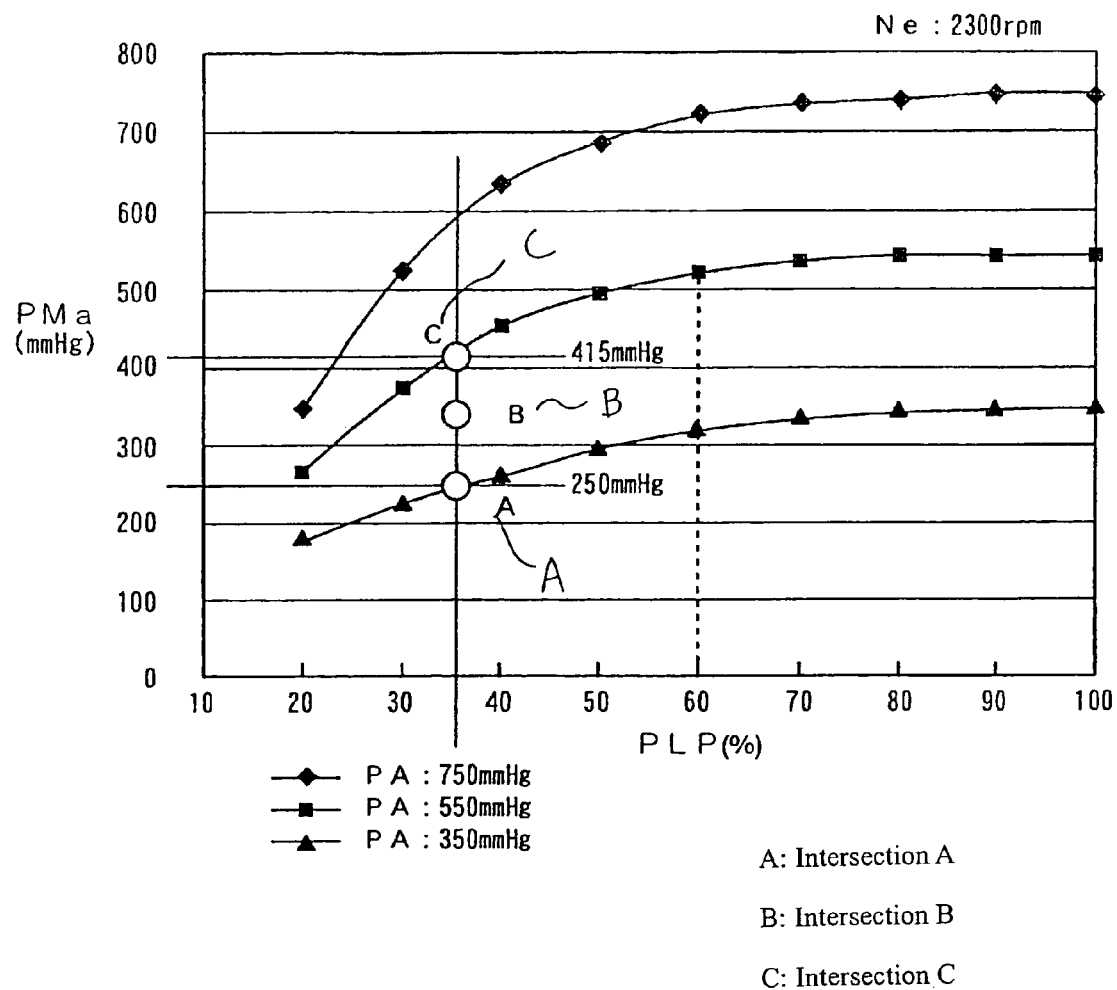
FIG. 7 is another data table to be used for the calculation of an estimated manifold pressure value.

FIG. 7 is a data table showing the relation between the manifold pressure PMa and the throttle opening PLP in the case that the engine speed Ne is fixed to 2300 rpm and the atmospheric pressure PA is varied to 750 mmHg, 550 mmHg, and 350 mmHg.

By using the data of characteristic curves shown in FIG. 7 without the use of the above-mentioned representative atmospheric pressure, an estimated manifold pressure value PMcal at an intermediate atmospheric pressure not lying on these characteristic curves can be obtained in the following manner. In the case that an aircraft having the engine 1 is flying at an altitude of 9500 feet under the conditions that the atmospheric pressure PA is 520 mmHg, the engine speed Ne is 2300 rpm, and the throttle opening PLP is 35%, the estimated manifold pressure value PMcal at the atmospheric pressure PA of 520 mmHg can be obtained by using this data table in the following manner. First, an intersection A between a vertical line corresponding to the throttle opening PLP of 35% and the characteristic curve corresponding to the atmospheric pressure PA of 350 mmHg is obtained. Similarly, an intersection C between this vertical line and the characteristic curve corresponding to the atmospheric pressure PA of 550 mmHg is obtained. Accordingly, it is assumed that an intersection B between the vertical line corresponding to the throttle opening PLP of 35% and a characteristic curve corresponding to the atmospheric pressure PA of 520 mmHg falls between the intersections A and C.

A value for the manifold pressure PMa corresponding to the intersection B can be obtained by interpolation according to the coordinates of the intersections A, B, and C. More specifically, the coordinates (PLP, PMa, PA) of the intersections A, B, and C are given as A (35, 250, 350), B (35, PMa, 520), and C (35, 415, 550). Accordingly, the manifold pressure PMa in this case can be calculated by the expression of PMa=250+[(415−250)/(550−350)]×(520−350). As the result of this calculation, the manifold pressure PMa, i.e., the estimated manifold pressure value PMcal becomes 390 mmHg.

For example, a plurality of data tables as shown in FIG. 7 may be prepared for every 500 rpm of various engine speeds Ne ranging from 500 rpm to 3000 rpm as an available upper limit, and these data tables may be preliminarily stored in the ECUs 14A and 14B. As a result, various estimated manifold pressure values PMcal can be calculated according to various engine speeds Ne.

Figure 8:
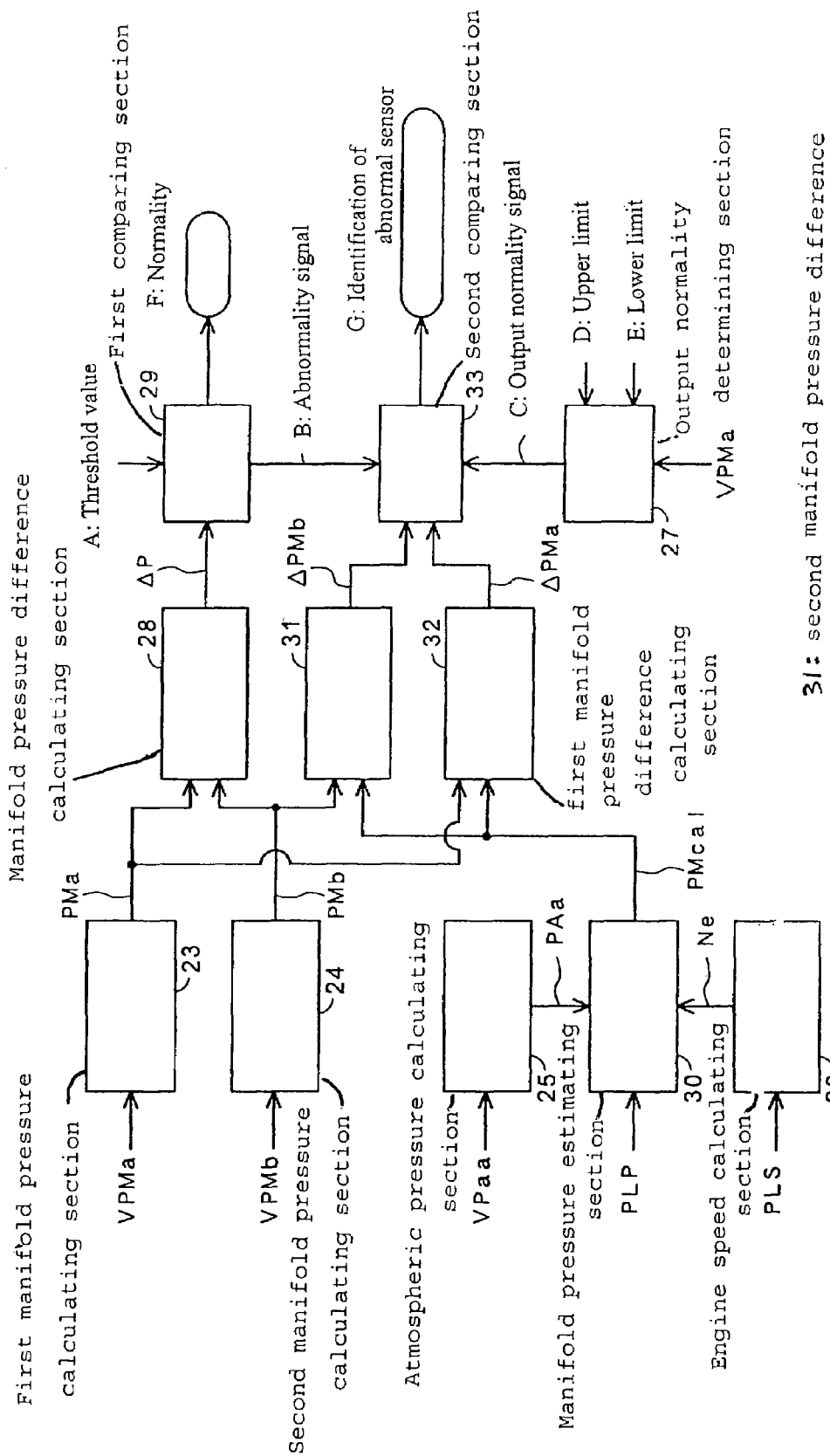
FIG. 8 is a block diagram showing the function of an essential part of the failure diagnosing device.

FIG. 8 is a block diagram showing the function of an essential part of the ECU 14A for performing the processing described above with reference to the flowchart shown in FIG. 4. A first manifold pressure calculating section 23 is provided to calculate a manifold pressure PMa according to a detection value VPMa output from the first manifold pressure sensor 5A. A second manifold pressure calculating section 24 is provided to calculate a manifold pressure PMb according to a detection value VPMb output from the second manifold pressure sensor 5B. An atmospheric pressure calculating section 25 is provided to calculate an atmospheric pressure PAa according to a detection value VPaa output from the atmospheric pressure sensor 9a. An engine speed calculating section 26 is provided to calculate an engine speed Ne according to the crank pulses PLS.

An output normality determining section 27 is provided to determine whether or not the detection value VPMa from the first manifold pressure sensor 5A falls within a predetermined range, i.e., between an upper limit and a lower limit, and to output an output normality signal when the detection value VPMa falls within the predetermined range.

A manifold pressure difference calculating section 28 is provided to calculate a difference ΔP between the manifold pressures PMa and PMb. A first comparing section 29 is provided to compare the difference ΔP with a threshold value DP, and to output a normality signal when the difference ΔP is less than the threshold value DP or an abnormality signal when the difference ΔP is greater than the threshold value DP. The manifold pressure difference calculating section 28 and the first comparing section 29 constitute abnormality recognizing means.

A manifold pressure estimating section 30 is provided to calculate an estimated manifold pressure value PMcal according to the engine speed Ne, the throttle opening PLP, and the atmospheric pressure PAa. For example, the manifold pressure estimating section 30 estimates a manifold pressure by using the data table shown in FIG. 6 or FIG. 7. A second manifold pressure difference calculating section 31 is provided to calculate a difference ΔPMb between the manifold pressure PMb and the estimated manifold pressure value PMcal. A first manifold pressure difference calculating section 32 is provided to calculate a difference ΔPMa between the manifold pressure PMa and the estimated manifold pressure value PMcal. A second comparing section 33 is provided to compare the difference ΔPMa and the difference ΔPMb in response to the abnormality signal input from the first comparing section 29 and the output normality signal input from the output normality determining section 27. The second comparing section 33 determines that the first manifold pressure sensor 5A is abnormal when the difference ΔPMa is greater than the difference ΔPMb or that the second manifold pressure sensor 5B is abnormal when the difference ΔPMb is greater than the difference ΔPMa. The second manifold pressure difference calculating section 31, the first manifold pressure difference calculating section 32, and the second comparing section 33 constitute abnormality identifying means.

In such a system having a plurality of manifold pressure sensors in individual groups, any one of the manifold pressure sensors abnormal in function due to deterioration or the like can be identified by estimating a manifold pressure from the engine speed Ne, the throttle opening PLP, and the atmospheric pressure PAa and then comparing the difference between the estimated manifold pressure value PMcal and the manifold pressure PMa detected by the first manifold pressure sensor 5A with the difference between the estimated manifold pressure value PMcal and the manifold pressure PMb detected by the second manifold pressure sensor 5B.

In this preferred embodiment, the determination of abnormality and the identification of an abnormal sensor are performed according to the difference between the pressure values detected by the first and second manifold pressure sensors 5A and 5B and according to the difference between the pressure value detected by the first manifold pressure sensor and the estimated manifold pressure value and the difference between the pressure value detected by the second manifold pressure sensor and the estimated manifold pressure value.

Alternatively, the determination of abnormality and the identification of an abnormal sensor may be performed according to a ratio in manifold pressure in place of the difference in manifold pressure. For example, the manifold pressure difference calculating section 28 may be replaced by means for calculating the ratio between the manifold pressures PMa and PMb. Further, the first comparing section 29 may determine whether or not the ratio calculated above falls within a predetermined range about a predetermined value, or "1", and according to the result of this determination, the first comparing section 29 may determine whether both of the first and second manifold pressure sensors 5A and 5B are normal or at least one of them is abnormal. For example, if the ratio of PMa/PMb falls within the range of 0.95 to 1.05, it is determined that both of the first and second manifold pressure sensors 5A and 5B are normal, whereas if the ratio of PMa/PMb falls outside this range, it is determined that at least one of the first and second manifold pressure sensors 5A and 5B is abnormal.

Similarly, the second manifold pressure difference calculating section 31 may be replaced by means for calculating the ratio between the detected manifold pressure PMa and the estimated manifold pressure value PMcal, and the first manifold pressure difference calculating section 32 may be replaced by means for calculating the ratio between the detected manifold pressure PMb and the estimated manifold pressure value PMcal. Further, the second comparing section 33 may compare the ratios calculated above with a predetermined value, or "1", and may identify the abnormal manifold pressure sensor corresponding to the ratio more deviating from the predetermined value.

Figure 1:
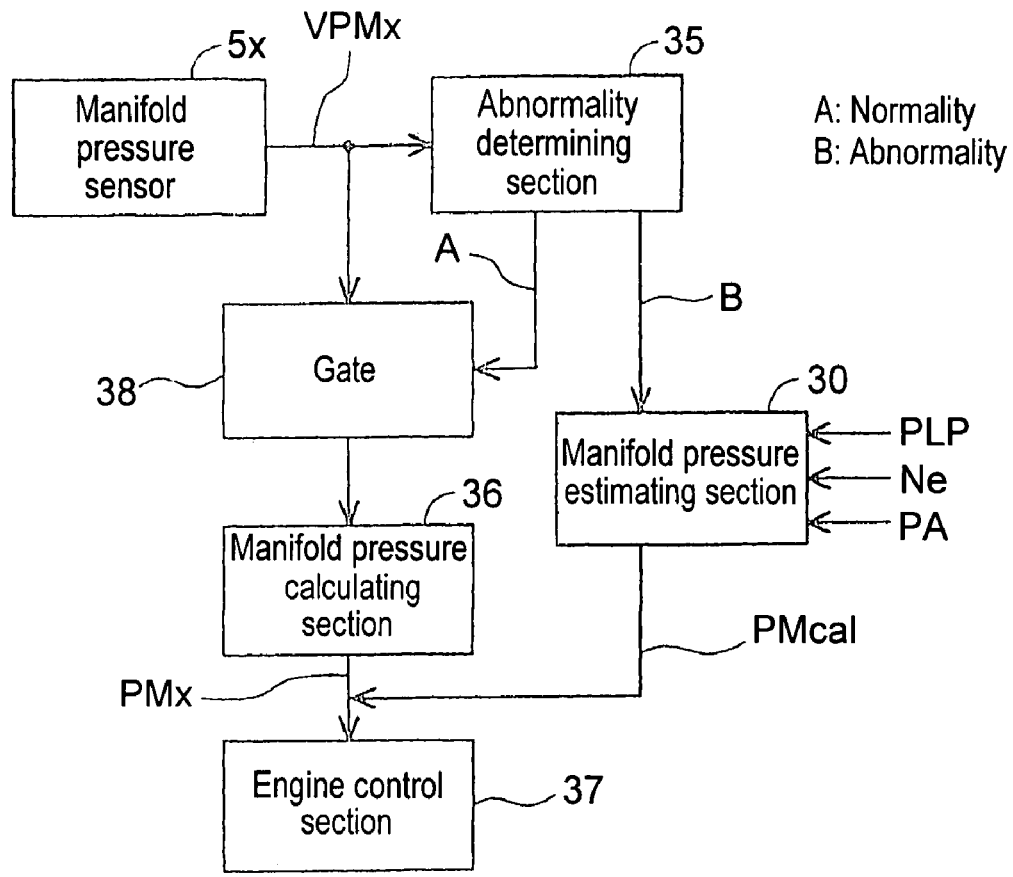
FIG. 1 is a block diagram showing the function of an essential part of a sensor output compensating device according to a preferred embodiment of the present invention.

FIG. 1 is a block diagram showing the function of an essential part of the ECU 14x for performing the processing described with reference to the flowchart shown in FIG. 5. An abnormality determining section 35 is provided to determine whether or not the manifold pressure sensor 5x is abnormal according to whether or not the output voltage VPMx from the manifold pressure sensor 5x falls outside a predetermined range (e.g., 0.5 to 4.5 V). If the manifold pressure sensor 5x is not abnormal, a gate 38 is opened to input the output voltage VPMx into a manifold pressure calculating section 36. The manifold pressure calculating section 36 has a conversion table showing the correspondence between the voltage value VPMx and the pressure value PMx, and outputs the pressure value PMx corresponding to the voltage value VPMx input from the gate 38. The manifold pressure PMx is input into an engine control section 37, and it is used for the computation of a fuel injection amount and ignition timing.

If the manifold pressure sensor 5x is abnormal, it is determined that both of the manifold pressure sensors 5A and 5B have failed. In the case of such a double failure condition, the manifold pressure estimating section 30 calculates the estimated manifold pressure value PMcal, which is then input as a substitute value for the manifold pressure PMx into the engine control section 37.

In this manner, if all of the plural manifold pressure sensors in individual groups have failed, an estimated manifold pressure value is calculated by using the outputs from the other sensors except the failed manifold pressure sensors, including engine speed, throttle opening, and atmospheric pressure. Then, the estimated manifold pressure value thus calculated is used in place of the detected manifold pressures, thereby allowing the continuation of engine control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine control device having a first manifold pressure sensor, a second manifold pressure sensor serving as a backup for said first manifold pressure sensor, an atmospheric pressure sensor, engine speed detecting means, and a throttle sensor, said engine control device comprising:
   pressure calculating unit calculating an estimated manifold pressure value according to detection outputs from said atmospheric pressure sensor, said engine speed detecting means, and said throttle sensor;
   abnormality detecting unit for detecting the abnormality of said first and second manifold pressure sensors; and
   engine controlling unit using a detection output from one of said first and second manifold pressure sensors when the abnormality of the other is detected or using said estimated manifold pressure value calculated above when the abnormality of both of said first and second manifold pressure sensors is detected.

2. The engine control device according to claim 1, wherein the engine control device includes a first system with the first manifold pressure sensor and a first ECU, and a second system with the second manifold pressure sensor and a second ECU.

3. The engine control device according to claim 2, wherein the atmospheric pressure sensor includes a first atmospheric sensor in the first ECU and a second atmospheric sensor in the second ECU.

4. The engine control device according to claim 2, wherein the first ECU is adapted to send a selector signal SA to a first input of a NAND circuit, and the ECU 14B is adapted to send a selector signal SB through a NOT circuit to a second input of the NAND circuit.

5. The engine control device according to claim 4, wherein the first ECU is adapted to send an output of the NAND circuit to a first selector switch, while concurrently sending the output of the NAND circuit through another NOT circuit to a second selector switch.

6. The engine control device according to claim 5, wherein a power supply is adapted to send a current through a drive coil according to the state of an injection signal output terminal connected to either the first selector switch or the second selector switch selected by the selector signal SA or SB.

7. The engine control device according to claim 1, wherein the engine control device includes pressure difference calculating means for calculating the difference ΔP between a pressure sensed the first manifold pressure sensor and a pressure sensed by the second manifold pressure sensor.

8. The engine control device according to claim 7, wherein the engine control device includes first comparing unit adapted to compare the difference ΔP to a threshold value DP, and adapted to output a normality signal when the difference ΔP is less than the threshold value DP, or an abnormality signal when the difference ΔP is greater than the threshold value DP.

9. The engine control device according to claim 8, wherein the engine control device includes first comparing unit adapted to determine whether or not the ratio calculated above falls within a predetermined range about a predetermined value, and according to a result of this determination, the first comparing section determines whether both of the first and second manifold pressure sensors are normal, or at least one of them is abnormal.

10. The engine control device according to claim 1, wherein the engine control device includes ratio calculating means for calculating a ratio between a pressure sensed the first manifold pressure sensor and a pressure sensed by the second manifold pressure sensor.

11. A control method for an engine having a first manifold pressure sensor and a second manifold pressure sensor serving as a backup for said first manifold pressure sensor in the case that said first manifold pressure sensor has failed, said control method comprising the steps of:
- calculating an estimated manifold pressure value according to an engine speed, a throttle opening, and an atmospheric pressure in the case that both of said first and second manifold pressure sensors have failed; and
- substituting said estimated manifold pressure value for a detected manifold pressure value.

12. The control method according to claim 11, further comprising the step of providing a first system with the first manifold pressure sensor and a first ECU, and a second system with the second manifold pressure sensor and a second ECU.

13. The control method according to claim 12, further comprising the step of providing a first atmospheric sensor in the first ECU, and a second atmospheric sensor in the second ECU.

14. The control method according to claim 12, further comprising the step of sending a selector signal SA from the first ECU to a first input of a NAND circuit, and sending a selector signal SB from the second ECU through a NOT circuit to a second input of the NAND circuit.

15. The control method according to claim 14, further comprising the step of sending an output of the NAND circuit to a first selector switch, while concurrently sending the output of the NAND circuit through another NOT circuit to a second selector switch.

16. The control method according to claim 15, further comprising the step of sending a current through a drive coil according to the state of an injection signal output terminal connected to either the first selector switch or the second selector switch selected by the selector signal SA or SB.

17. The control method according claim 11, further comprising the step of calculating the difference $\Delta P$ between a pressure sensed the first manifold pressure sensor and a pressure sensed by the second manifold pressure sensor.

18. The control method according to claim 17, further comprising the step of comparing the difference $\Delta P$ to a threshold value DP, and outputting a normality signal when the difference $\Delta P$ is less than the threshold value DP, or outputting an abnormality signal when the difference $\Delta P$ is greater than the threshold value DP.

19. The control method according to claim 11, further comprising the step of calculating a ratio between a pressure sensed the first manifold pressure sensor and a pressure sensed by the second manifold pressure sensor.

20. The control method according to claim 19, further comprising the step of determining whether or not the ratio calculated above falls within a predetermined range about a predetermined value, and according to a result of this determination, determining whether both of the first and second manifold pressure sensors are normal, or at least one of them is abnormal.

* * * * *